United States Patent [19]

Raab et al.

[11] Patent Number: 5,244,009
[45] Date of Patent: Sep. 14, 1993

[54] ASSEMBLY FOR FLOW REGULATION AND FOR OPENING A FLOW-THROUGH CONDUIT FOR LIQUIDS UNDER PRESSURE

[75] Inventors: Alfred Raab, Attenhofen; Heinz-Werner Giefer, Sontheim; Walter Eichler, Gerstetten, all of Fed. Rep. of Germany

[73] Assignees: The Coca-Cola Company, Atlanta, Ga.; Bosch-Siemens Hausgerate GmbH, Fed. Rep. of Germany

[21] Appl. No.: 745,392

[22] Filed: Aug. 15, 1991

[30] Foreign Application Priority Data

Aug. 16, 1990 [DE] Fed. Rep. of Germany ....... 4025981

[51] Int. Cl.⁵ .................... F16K 31/44; F16K 31/126
[52] U.S. Cl. ................................. 137/613; 137/503; 251/298; 138/45
[58] Field of Search ........... 137/613, 503, 510, 614.21, 137/859; 138/45, 46; 251/298, 367

[56] References Cited

U.S. PATENT DOCUMENTS

| | | | |
|---|---|---|---|
| 3,608,579 | 9/1971 | Moore | 251/298 X |
| 4,250,915 | 2/1981 | Rikuta | 137/503 X |
| 4,665,809 | 5/1987 | Aschberger et al. | |
| 4,685,310 | 8/1987 | Stegmann et al. | 137/614.21 X |
| 4,867,198 | 9/1989 | Faust | 137/503 |

FOREIGN PATENT DOCUMENTS 3430953 8/1990 Fed. Rep. of Germany.

Primary Examiner—Martin P. Schwadron
Assistant Examiner—Kevin L. Lee
Attorney, Agent, or Firm—Birch, Stewart, Kolasch & Birch

[57] ABSTRACT

An assembly for regulating the flow of liquid includes a housing made of a first, second and third housing part. The housing parts being placed immediately following one another in the flow direction. The second of three housing parts constitutes a component of a discharge shutoff valve and a component of a flow regulating valve into which a flow-through conduit is integrated between the discharge shutoff valve and the flow regulating valve immediately following it in the flow direction. The assembly includes no freely moving parts and is distinguished by a compact construction.

16 Claims, 3 Drawing Sheets

ASSEMBLY FOR FLOW REGULATION AND FOR OPENING A FLOW-THROUGH CONDUIT FOR LIQUIDS UNDER PRESSURE

BACKGROUND OF THE INVENTION

The present invention relates to an arrangement for flow regulation and for opening a flow-through conduit for liquids under pressure, in particular carbonated water, including a discharge shutoff valve that can be controlled by an actuation device and of a flow regulating valve that provides a constant flow independently of the pressure of the incoming liquid.

Such an arrangement is used to keep a constant rate of flow of liquids per unit of time to achieve, in combination with a time limit on the delivery of the liquid, high precision in the volume of liquid to be dispensed. For example, in beverage dispensers, in which soft drinks are mixed and prepared from carbonated water and beverage concentrates, it is required that the preset mixing ratio of both components be followed as closely as possible, since otherwise a change in taste would result and strongly influence the quality of the soft drink.

For beverage concentrates to be mixed in relatively small amounts, usually a volumetric feed is used and thus also a high precision in the volume dispensed is achieved.

To achieve also the required precision of the volume dispensed with respect to the carbonated water and thus the desired mixing ratio, it is required that both parameters that determine the volume, namely the flow rate and the inflow time, be established as precisely as possible. The flow-through time can be controlled relatively well by open-close valves, although the closing and opening operations represent disturbances for relatively short release times.

Controlling the flow rate is considerably more problematic. Briefly occurring pressure variations an temperature variations must also be taken into consideration. Likewise, with gaseous liquids, the liquid-gas mixture tends to degas because of pressure drop, flow turbulences, and warming in the area of a flow regulating valve.

In beverage dispensers, the carbonated water is mixed in a carbonator from water and $CO_2$ gas, is stored under pressure and cooled to near the freezing point. When carbonated water is dispensed, considerable pressure variations occur. The release is performed in the range of atmospheric, i.e., constant, pressure. With prolonged nonoperating times, the flow regulating valve is warmed to room temperature, and by the release of carbonated water it is cooled to below 0° C. Therefore, demanding requirements are placed on such a regulating valve. But as an object to be produced economically, it should also be inexpensive.

From German patent P 34 30 953 there is already known an arrangement for mixing liquids with a pressure-independent flow regulating valve. The flow-regulating valve includes a movable piston located in a cylindrical piston chamber and upon which the restoring force of a spring acts. The flow medium flows through a central bore in the piston to discharge openings in the cylinder, which are partly covered by the piston regulating edge. The spring raises the counter-force to the pressure of the medium and establishes the working pressure. Between piston and cylinder a gap is provided that has a sealing function. Thus the gap is small and has a narrow tolerance. Contaminations between piston and cylinder disturb the function of the regulation and lead to incorrect releases or to failure of the arrangement. In addition, the relatively complex design of the known regulating valve, because of numerous individual components that also move, involves the danger of a failure of the overall arrangement if even one individual component is impaired in its ability to function.

SUMMARY OF THE INVENTION

In view of these circumstances, the object of this invention is to develop a compactly designed arrangement for a pressure-independent flow regulating device that includes only a small number of moving individual components.

An arrangement that meets these requirements is characterized according to the invention in that the arrangement comprises a housing made of a first, second and third housing part, arranged immediately following one another in the flow direction, and in that the second of the three housing parts constitutes a component of a discharge shutoff valve and a component of the flow regulating valve, into which a flow-through conduit is integrated between the discharge shutoff valve and the flow regulating valve.

The invention is distinguished by many advantages. The arrangement exhibits only three housing parts that conjointly constitute the body of the arrangement. Further, the arrangement includes according to other advantageous embodiments, only two moving parts, namely a diaphragm in the flow regulating valve and a flap that also constitutes the actuation device in the discharge shutoff valve.

In addition, the diaphragm is not freely moving, in contrast to a piston in the prior art, but is fixed in the body of the arrangement. Also the flap of the discharge valve is fixed in the body of the arrangement.

The diaphragm practically experiences little wear and thereby guarantees a long lifetime of the arrangement. The relatively low weight of the diaphragm results in only a brief reaction and response time. The flap is also very durable and guarantees, like the diaphragm, a long lifetime for the arrangement.

The arrangement can be compactly designed and, because of the simple design, economically manufactured. The compact construction results from the fact that the entire arrangement includes only three housing parts into which the discharge shutoff valve with the above-mentioned flap and the flow regulating valve with the above-mentioned diaphragm and a pin are integrated.

According to an advantageous embodiment of the invention, the flow regulating valve is placed immediately following the discharge shutoff valve in the flow direction. An arrangement built according to these features of the invention follows the concept of assigning different functional requirements to different functional units and of arranging the latter as functionally close to one another as possible. A functional requirement is present in the fact that the opening time of the release valve, predetermined by the time control, is performed as exactly as possible. For this reason, a discharge shutoff valve is used that can meet this very objective to an extraordinary extent. But this component is not responsible for the flow regulation. For this purpose, a valve controlling a constant flow independently of the pressure of the supplied liquid is used. This valve is also very accurate. But it is also essential that both functional units be placed in the immediate vicinity of one another, so that an uncontrolled outflow of the liquid during the switching phases of the discharge shutoff valve is avoided to the greatest extent possible.

Another advantageous embodiment is characterized in that the discharge shutoff valve is formed by the first and second housing part and by the actuation device, which consists of a flap sandwiched between the two housing parts with a closing part and an actuation lever connected to the flap, and in that a valve face interacting with the closing part of the flap is integrated into the second housing part.

In particular, the closing part of the flap in the area of the flow path on the side facing the inflowing water has a spherical design. This shaping of the closing part has the effect that, provided that the valve is not actuated by the actuation device, the water presses firmly against the flap and seals the flow-through conduit well. Further, this shaping of the closing part has the effect that the flap, immediately following actuation, quickly returns to its rest position.

Here the flap with the closing part is preferably placed inside a ring fixed between the first and second housing part and consist of a radially running web that is connected on one side to the ring and extends up to the closing part placed in the area of the flow path, in the center of the ring. The actuation lever is preferably connected as an extension of the web to the ring.

These configurations of the actuation device are distinguished by a simple structural and simultaneously robust design that can be achieved simply and economically from a production aspect.

Another advantageous embodiment is characterized in that a diaphragm with a bore is fixed between the second and third housing part perpendicular to the direction of the inflowing water, and that a pin is placed in the third housing part in the area of the diaphragm bore so that water flowing into the second housing part goes through the bore of the diaphragm and presses the latter in the direction of the pin.

Thus a flow regulation independent of the pressure is achieved in a simple way and with only one moving part, the diaphragm.

Another advantageous embodiment is characterized in that the third housing part provides a support against which the diaphragm presses at a predetermined pressure of the inflowing water. This increases the spring rigidity of the diaphragm. A plastic deformation of the diaphragm, which would limit the ability of the valve to function, is prevented.

The pin is advantageously mounted adjustably perpendicular to the diaphragm. The adjustable mounting makes it possible to compensate for manufacturing tolerances.

According to other advantageous embodiments of the invention, the pin is made as an adjustable screw and exhibits a limit stop that limits the movement in the direction of the diaphragm. The latter prevents the pin from touching the diaphragm even during maximum pressure of the inflowing water and thus from possibly limiting the diaphragm's ability to function or destroying the diaphragm.

It further proves advantageous for the pin to exhibit, in the area of the diaphragm bore, a conical tip, in particular with an angle of 90°. With this pin configuration, the influence of a possible $CO_2$ impregnation of the water and the dependence on the temperature are so slight that a predetermined tolerance of the output amount is maintained.

An embodiment that proves to be especially advantageous from a flow engineering viewpoint is one in which the diaphragm is circular and the bore is placed centrally in the diaphragm. Here the diaphragm is mounted shaped like a circle at a predetermined distance from its circular outer edge.

Other advantageous embodiments of the invention are characterized in that the third housing part includes a discharge opening that empties into a discharge pipe, and the discharge pipe is placed laterally offset and parallel to the inflow direction of the water or is bent by 90° relative to the inflow direction of the water. In particular, the discharge pipe has a larger diameter than the discharge opening. The deflection of the water flow direction retards the discharge rate and reduces noise. These configurations further cause the water to leave the valve as a concentrated jet.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention will become more fully understood from the detailed description given hereinbelow and the accompanying drawings which are given by way of illustration only, and thus, are not limitative of the present invention and wherein:

DETAILED DESCRIPTION OF PREFERRED EMBODIMENTS

Figure 1:
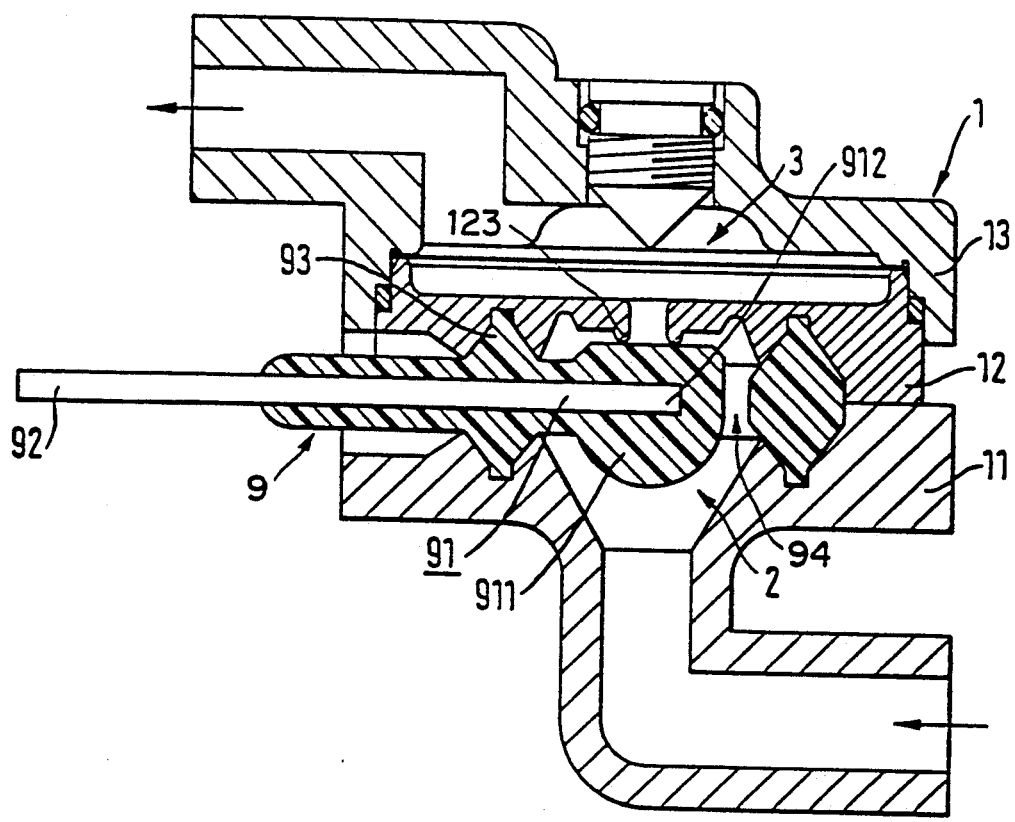
FIG. 1, is a vertical section through the flow regulation arrangement according to the invention.

The arrangement according to the invention represented in FIG. 1 is used to regulate flow and to open or close a flow-through conduit for liquids under pressure, in particular for carbonated water.

The arrangement according to the invention, as it is suitably used for releasing carbonated water from a carbonator of a beverage dispenser, by which soft drinks are prepared from the carbonated water and the beverage concentrates to be mixed in, consists of a discharge shutoff valve 2 and of a flow regulating valve 3. Flow regulating valve 3 is placed immediately following discharge shutoff valve 2 in the flow direction.

The flow direction is marked by the arrow drawn in FIG. 1.

Housing 1 consists of three housing parts 11, 12 and 13 that are placed immediately following one another in the flow direction. Second housing part 12 constitutes a component of discharge shutoff valve 2 and a component of flow regulating valve 3, and the flow-through conduit between discharge shutoff valve 2 and flow regulating valve 3 is integrated into second housing part 12.

Discharge shutoff valve 2 comprises a flap valve and consists of first and second housing part 11, 12 and includes an actuation device 9. The latter consists of a flap 91 fixed sandwiched between two housing parts 11, 12 with a closing part 911 and an actuation lever 92 connected to flap 91.

Closing part 911 of flap 91 is preferably spherically shaped in the area of the flow path on the side facing the inflowing water. This shaping of closing part 911 has the effect that, provided the valve 2 is not opened by actuation device 9, the water presses firmly against flap 91, which then for its part presses firmly against second housing part 12 in the area of a valve seat 123 integrated into housing part 12. With its closing part 911, flap 91 thus seals the flow-through conduit.

Flap 91 with closing part 911 is placed inside a ring 93 that is fixed between first and second housing part 11, 12 and consists of a radially running web 912 that is connected on one side to ring 93 and extends up to closing part 911 placed in the area of the flow-through conduit in the center of ring 93. Except for the actuation device 9, an annular space 94 exists between the ring 93 and the closing part 911. Ring 93 consists of sealing material.

Actuation lever 92 is connected as an extension of web 912 to ring 93. Actuation lever 92 is connected to web 192 in such a way that a force acting on actuation lever 92 in FIG. 1 from below upwardly guides web 912 downward against the flow direction of the water and thus opens the flow-through conduit. Actuation lever 92 is preferably actuated by a sequence switch cam or electromagnetically.

Flow regulating valve 3, placed immediately following discharge shutoff valve 2 in the flow direction is constituted, among other things, by the second and third housing part 12 and 13. An embodiment of such a flow regulating valve 3 is further illustrated in FIG. 2.

Figure 2:
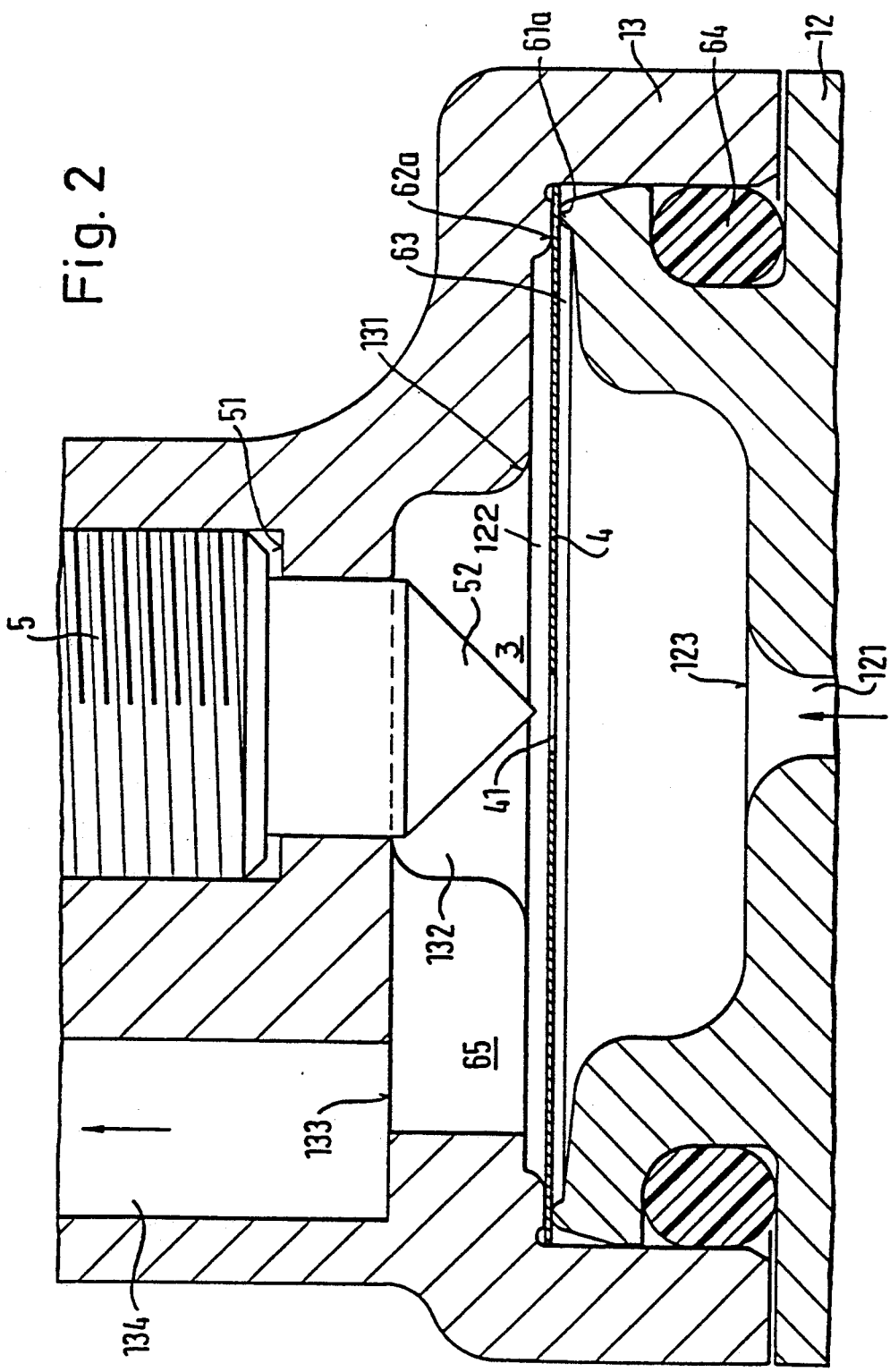
FIG. 2, is an enlarged section through the upper part of the arrangement according to FIG. 1, which forms a flow regulating valve portion.
Figure 3:
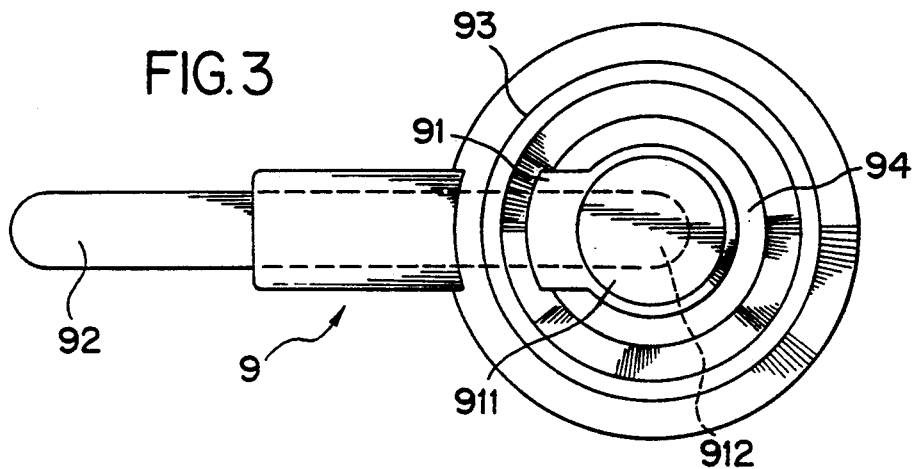
FIG. 3 is a top planar view of the actuation device for the actuation device shown in FIG. 1.
Figure 4:
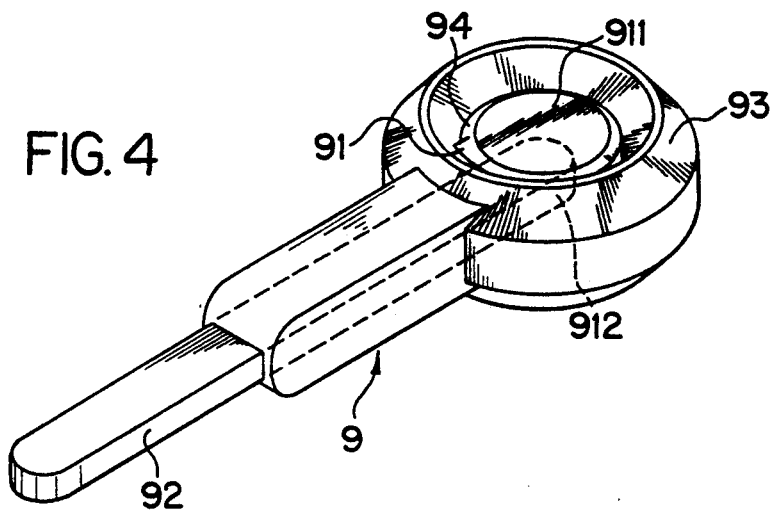
FIG. 4 is a perspective view of the actuation device shown in FIG. 3.

The interior of the valve 3 illustrated in FIG. 2 widens starting at an inflow opening 121 into an outer chamber 122. The transition from inflow opening 121 to outer chamber 122, which is made circular at least in the area of a diaphragm 4, as well as the wall of the outer chamber, exhibit a curved shape in the embodiment represented in the figure. Such a shape without a volume increase prevents significant amounts of the gas first bound with the water from being released.

A diaphragm 4 is placed perpendicular to the direction (arrow below in FIG. 2) of the inflowing water and includes a preferably central bore 41 whose diameter is preferably smaller or equal to the diameter of inflow opening 121.

Outer chamber 122 forms, on its side facing away from the inflow opening, a chamber 132 into which a pin 5 projects. Pin 5 is located in an extension of the path leading from inflow opening 121 to bore 41 of diaphragm 4.

In the area of the bore 41 of the diaphragm 4, pin 5 preferably exhibits a conical tip that forms an angle of 90°. It can be mounted adjustably perpendicular to the diaphragm 4 and be made as an adjustable screw. The adjustment in the direction of the diaphragm is limited by a limit stop 51.

The pin 5 positions the operating point of the valve 3. The operating point is determined for a predetermined distance between the (loaded) diaphragm and, in particular, its conical surface 52 in the area of the diaphragm bore 41 essentially by the diameter of the diaphragm bore, the rigidity of the diaphragm and the support of the diaphragm in the valve interior. The adjustment of pin 5 makes it possible for the adjustment range of the valve 3 to be changed only within narrow limits; the adjustment being used mainly to compensate for possibly existing manufacturing tolerances.

Diaphragm 4 is shaped like a circle and is mounted at a predetermined distance from its circular outer edge. The circular or annular support of the diaphragm 4 is formed on the one hand by second housing part 12 represented below in FIG. 2 and on the other hand by third housing part 13 represented above in FIG. 2 at 61a and 62a. Diaphragm 4 is fixed by both housing parts 12, 13, and, in the area of the diaphragm support, the housing parts form an open space 63 for the circular outer edge of the diaphragm. If inflowing water presses against the diaphragm 4, it moves through the area of its central bore 41 against pin 5 and moves upward in open space 63 as shown in FIG. 2 formed by housing parts 12 and 13.

Both housing parts 12, 13 are shaped in the area of the diaphragm support 61a and 62a so that they support the movement of the diaphragm 4 under the influence of the pressure changes occurring at the diaphragm. For example, second housing part 12 exhibits the rounded shape represented the FIG. 2 in the area of the diaphragm support at the summit of its outer wall 61a, which simultaneously constitutes a wall of open space 63. Third housing part 13 exhibits a corresponding rounded shape at the side, facing the valve center, of a horizontal diaphragm support 62a.

When the inflowing water exceeds a predetermined pressure, diaphragm 4 braces against a support 131 that is placed on the side of diaphragm 4 facing away from inflow opening 121. This increases the spring rigidity of diaphragm 4; its plastic deformation, which would limit or eliminate its ability to function, is avoided. Simultaneously, the adjustment range of the valve is expanded.

Outer chamber 122 of the flow regulating valve extends to the side of diaphragm 4 facing away from the inflow opening and forms a chamber 132 that empties into a discharge opening 133. Pin 5 is located in the center of this chamber 132.

Chamber 132 includes, immediately next to diaphragm 4, a horizontal outlet area 65 that is limited below by the diaphragm 4 in its rest position and above by support 131. The height of area 65 corresponds to the diaphragm deflection at the predetermined setpoint pressure. The chamber constituted by area 65 makes it possible for small dirt particles to be rinsed out of the water by the pumplike movement of diaphragm 4 during pressure changes. Chamber 132 receives the water flowing through bore 41 of diaphragm 4 and around the tip of pin 5 and guides it to where it flows out of chamber outlet area 65 to the discharge opening 133. The chamber 132 so dimensioned that a predetermined backpressure of the water forms and in doing so gas bubbles that are formed by gas escaping from the water are absorbed.

In the embodiment represented in FIG. 2, discharge opening 133 is placed perpendicular diaphragm 4 in chamber 132. According to another embodiment, not represented in either of FIGS. 1 and 2, discharge opening 133 is placed at a side wall of chamber 132 approximately perpendicular to diaphragm 4.

Discharge opening 133 empties into a discharge pipe 134 that is disposed laterally offset and parallel to the inflow direction of the water. According to another embodiment, also not represented in the Figures, discharge pipe 134 can also be placed perpendicular to the inflow direction of the water, i.e., parallel to diaphragm 4.

Discharge opening 133 empties into a discharge pipe 134 that preferably exhibits a larger diameter compared to discharge opening 133. The narrow point that is formed by discharge opening 133, as well as the deflection of the water flow direction, retard the discharge of the water and reduce the discharge rate. This also causes the discharging water to make less noise.

The described ratio of the diameter of discharge opening 133 and discharge pipe 134 causes an exiting, slowed water jet, in a concentrated way, to fill discharge pipe 134 over its entire width and avoid a spraying of the exiting jet.

Diaphragm 4 assumes the function of a piston with a pressure spring as in the prior art. In the flow regulating valve 3 of the arrangement according to the invention, the regulation is performed by an annular gap between diaphragm bore 41 and the conical area 52 of pin 5. The pressure of the water flowing into the interior of the valve 3 moves diaphragm 4 in the direction of the conical area of pin 5 and thus, as a function of the water pressure and of the spring force of diaphragm 4, adjusts the annular gap. This constitutes the opening area for the water.

The regulation process is also a function of the diameter of diaphragm bore 41. The regulation first occurs when the opening area through the annular gap is smaller than the area of the diaphragm bore.

Both housing parts 12, 13 are first sealed relative to one another in the area of the annular support of the firmly fixed diaphragm. Further, both housing parts are sealed by a sealing ring 64.

The flow regulation valve can be designed, for example, for pressure ranges between 4±1 bar and 5±1 bar. Other pressure ranges or flow rates can be achieved by suitable modifications of the diaphragm bore.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An arrangement for flow regulation and for opening a flow-through conduit for liquids under pressure, in particular carbonated water, comprising:

a discharge shutoff valve controlled by an actuation device;

an adjacent flow regulating valve controlling a constant flow independently of the pressure of the incoming liquid;

a housing including a first, a second and a third housing part, said housing parts being located immediately adjacent one another in the flow direction and wherein the second housing part of the three housing parts comprises a portion of both thee discharge shutoff valve and the flow regulating valve, wherein the discharge shutoff valve comprises a flap valve including a valve seat formed in the second housing part and valve means including a flap member sandwiched between both the first and second housing parts, a valve closure member centrally located inside a ring positioned between the first and second housing part and being engageable with the valve seat, said valve closure member further comprising a spherical portion in the area of the flow path on the side facing the inflowing water and a substantially flat face on a side directed toward the valve seat;

a radially running web connected on one side to said ring and on another side to the valve closure member; and an actuation lever connected to the flap.

2. The arrangement according to claim 1, wherein the actuation lever is connected as an extension of web to said ring.

3. The arrangement according to claim 1 wherein said flow regulating valve comprises a diaphragm including a bore fixed between the second and third housing part perpendicular to the direction of the inflowing water, and a pin located in the third housing part in in relatively close proximity to the bore, whereby water flowing into second housing part goes through the bore of diaphragm which flexes in the direction of the pin.

4. The arrangement according to claim 3, wherein the third housing part includes a support surface against which diaphragm presses for a predetermined pressure of the inflowing water.

5. The arrangement according to claim 3, wherein the pin is adjustably mounted perpendicular to the diaphragm.

6. The arrangement according to claim 5 wherein the pin comprises an adjustable screw.

7. The arrangement according to claim 6, wherein the third housing part includes a limit stop (51) for the pin that limits the movement of the pin in the direction of the diaphragm.

8. The arrangement according to claim 3, wherein the pin includes a conical tip protruding toward the bore of the diaphragm.

9. The arrangement according to claim 8, wherein the conical tip includes an angle of 90°.

10. The arrangement according to claim 3, wherein the diaphragm is circular and the bore is centrally located in the diaphragm.

11. The arrangement according to claim 10, wherein the diaphragm is mounted at a predetermined distance from its circular outer edge.

12. The arrangement according to claim 3, wherein the third housing part includes a discharge opening that empties into a discharge pipe.

13. The arrangement according to claim 12, wherein the discharge pipe is located laterally offset and parallel to the inflow direction of the water.

14. Arrangement according to claim 12, wherein discharge pipe is bent 90° relative to the inflow direction of the water.

15. The arrangement according to claim 12, wherein the discharge opening empties into a discharge pipe having a diameter which is larger than that of discharge opening.

16. The arrangement according to claim 3, wherein the discharge pipe is integral with the third housing part.

* * * * *